United States Patent [19]

Nilz et al.

[11] Patent Number: 6,114,435
[45] Date of Patent: Sep. 5, 2000

[54] PREPARATION OF AQUEOUS SOLUTIONS OF POLYMERS CONTAINING VINYLAMINE UNITS, WHICH SOLUTIONS HAVE A LONG SHELF LIFE, AND THEIR USE

[75] Inventors: Claudia Nilz, Rödersheim-Gronau; Manfred Winter, Dittelsheim-Hessloch; Michael Kröner; Andreas Stange, both of Mannheim; Rudolf Schuhmacher, Böhl-Iggelheim, all of Germany

[73] Assignee: BASF Aktiengesellschaft, Ludwigshafen, Germany

[21] Appl. No.: 08/716,280

[22] PCT Filed: Mar. 20, 1995

[86] PCT No.: PCT/EP95/01030

§ 371 Date: Sep. 30, 1996

§ 102(e) Date: Sep. 30, 1996

[87] PCT Pub. No.: WO95/26989

PCT Pub. Date: Oct. 12, 1995

[30] Foreign Application Priority Data

Mar. 31, 1994 [DE] Germany .............................. 44 11 311

[51] Int. Cl.$^7$ ...................................................... C08L 39/02
[52] U.S. Cl. .................. 524/548; 162/164.6; 162/164.7; 162/166; 162/168.2; 162/168.3; 162/168.4; 162/168.5; 524/555
[58] Field of Search .................................... 524/555, 548; 162/168.2, 168.3, 168.4, 168.5, 164.6, 164.7, 166

[56] References Cited

U.S. PATENT DOCUMENTS

| | | | |
|---|---|---|---|
| 3,558,581 | 1/1971 | Beermann et al. ...................... | 525/340 |
| 4,393,174 | 7/1983 | Dawson et al. .......................... | 525/369 |
| 4,421,602 | 12/1983 | Brunnmueller et al. ......... | 526/303.1 X |
| 4,490,557 | 12/1984 | Dawson et al. .......................... | 564/159 |
| 4,623,699 | 11/1986 | Brunnmueller et al. ................ | 525/355 |
| 4,774,285 | 9/1988 | Pfhol et al. ............................... | 525/60 |

*Primary Examiner*—Judy M. Reddick
*Attorney, Agent, or Firm*—Oblon, Spivak, McClelland, Maier & Neustadt, P.C.

[57] ABSTRACT

Solutions of polymers containing vinylamine units, which solutions have a long shelf life, are prepared by hydrolyzing polymers containing N-vinylcarboxamide units with acids in an aqueous medium and removing the carboxylic acids eliminated from the polymers as esters from the aqueous polymer solution after the hydrolysis by adding at least stoichiometric amounts of at least one $C_1$–$C_6$-alcohol and distilling off the esters from the reaction mixture, and said aqueous solutions are used as dry and wet strength agents in papermaking.

5 Claims, No Drawings

PREPARATION OF AQUEOUS SOLUTIONS OF POLYMERS CONTAINING VINYLAMINE UNITS, WHICH SOLUTIONS HAVE A LONG SHELF LIFE, AND THEIR USE

The present invention relates to a process for the preparation of aqueous solutions of polymers containing vinylamine units, which solutions have a long shelf life, by hydrolysing polymers containing N-vinylcarboxamide units with acids in an aqueous medium and removing the carboxylic acids eliminated from the polymers from the aqueous polymer solution, and the use of the aqueous polymer solutions as dry and wet strength agents in papermaking.

EP-B-0 071 050 discloses linear, basic polymers which contain vinylamine and vinylformamide units. The polymers are prepared by homopolymerization of N-vinylformamide and subsequent partial elimination of formyl groups from the polymers with acids or bases. Formic acid is formed from the eliminated formyl groups as a by-product of the hydrolysis. However, formic acid cannot be distilled off alone from the aqueous polymer solution. The formic acid/water azeotropic mixture boils at 107°.

The polymers can also be solvolyzed in alcohols with acids. The by-products of the solvolysis, ie. formates, can be removed from the system, for example by distillation, during or after the hydrolysis. However, since the prior art distillation is carried out in the presence of alcohols and, for example, hydrochloric acid, considerable amounts of alkyl chlorides are formed.

EP-B-0 216 387 discloses the use of partially hydrolyzed copolymers which contain polymerized vinylamine units and are obtained from N-vinylformamide and monoethylenically unsaturated monomers selected from the group consisting of vinyl acetate, vinyl propionate, the $C_1$–$C_4$-alkyl vinyl ethers, N-vinylpyrrolidone and the esters, nitriles and amides of acrylic acid and methacrylic acid.

DE-A-17 20 737 discloses a process for the preparation of basic polymers, in which homo- or copolymers of N-vinyl-N-methylcarboxamides are subjected to an acidic hydrolysis at elevated temperature. This results in the formation of formic acid, which is removed by distillation. However, it is also possible to add methanol before or in the course of the hydrolysis and to esterify the eliminated formic acid to methyl formate and thus to remove it from the reaction mixture.

EP-A-185 935 discloses a process for the preparation of pulverulent, linear basic polymers which contain vinylamine units. Here, gaseous hydrogen halide is allowed to act on pulverulent polymers of N-vinylformamide in the presence of not more than 5% by weight, based on the polymer used, of water. The elimination of the formyl group can also be carried out in $C_1$–$C_4$-alcohols. Pulverulent vinylamine polymers and formates are obtained. However, an undesirable amount of alkyl chlorides is formed here.

EP-B-O 251 182 discloses vinylamine copolymers which, in addition to vinylamine units, also contain N-vinylformamide, acrylonitrile, acrylamide and, if required, acrylic acid units. These copolymers are prepared by copolymerizing N-vinylformamide and acrylonitrile and then modifying the formyl groups and, where relevant, the nitrile groups of the copolymers under acidic conditions. The modification of the formyl groups can be carried out in the presence of alcohol, said groups being separated off in the form of formates. If the modification is carried out using hydrochloric acid, alkyl chlorides are formed here too and must be disposed of.

Although the publications cited above point out that the formyl groups and polymers of N-vinylformamide can be separated off in the form of formates by treatment with acids in the presence of alcohols, not a single example of this is to be found. The aqueous polymer solutions have to date been neutralized after the hydrolysis and used together with the neutral salts formed, or the hydrolyzed polymers have been isolated by precipitation from the aqueous solution with, for example, acetone. Owing to the large amounts of acetone required for this purpose, based on polymer, such a method for isolating polymers is technically uneconomical.

As has also been found, the aqueous polymer solutions described in the prior art examples and containing vinylamine units and carboxylic acids, in particular formic acid, lose activity on prolonged storage owing to reamidation and hence a reduction in the cationic charge density of the polymer, ie. such polymer solutions do not have a long shelf life.

It is an object of the present invention to provide a process, which can be carried out in a technically simple manner, for the preparation of aqueous vinylamine polymer solutions having a long shelf life, virtually no alkyl chlorides and scarcely any neutral salts being formed.

We have found that this object is achieved, according to the invention, by a process for the preparation of aqueous solutions of polymers containing vinylamine units, which solutions have a long shelf life, by hydrolyzing polymers containing N-vinylcarboxamide units with acids in an aqueous medium and removing the carboxylic acids eliminated from the polymers from the aqueous polymer solution, if polymers containing N-vinylformamide units are used and the eliminated formic acid is esterified after the hydrolysis by adding at least stoichiometric amounts of at least one $C_1$–$C_6$-alcohol, and the esters are distilled off from the reaction mixture, resulting in aqueous polymer solutions containing not more than 5% by weight of neutral salts.

Stable, aqueous solutions of polymers having vinylamine units are obtained, such solutions having a low salt content. The content of neutral salts, in particular sodium chloride and sodium formate, is below 5% by weight in the case of these solutions. The aqueous polymer solutions can be stored for several months without a significant loss of activity. The esters distilled off from the reaction mixture after the hydrolysis can be used, for example, in the synthesis of N-vinylformamide.

Polymers containing N-vinylcarboxamide units are to be understood as meaning homo- and copolymers of N-vinylcarboxamides. The N-vinylcarboxamides can be characterized, for example, with the aid of the following formula:

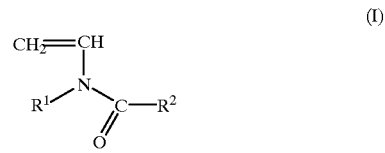

(I)

In formula I, $R^1$ and $R^2$ are identical or different substituents and are each H or $C_1$–$C_4$-alkyl. Examples of monomers of the formula I are N-vinylformamide, N-vinylmethylformamide, N-vinylacetamide, N-vinyl-N-methylacetamide, N-vinyl-N-ethylacetamide, N-vinylpropionamide, N-vinyl-N-methylpropionamide and N-vinylbutyramide. These monomers can be used alone or as a mixture with one another in the polymerization. From this group of monomers, N-vinylformamide is used according to the invention.

The novel process is particularly important for the hydrolysis of copolymers which contain (a) from 5 to 95 mol % of N-vinylformamide units and (b) from 95 to 5 mol % of units of at least one monomer selected from the group consisting of vinyl formate, vinyl acetate, vinyl propionate, N-vinylpyrrolidone, acrylic acid, methacrylic acid, the esters, amides and nitriles of acrylic acid or methacrylic acid and $C_1$–$C_4$-alkyl vinyl ethers.

Such copolymers can be prepared by free radical copolymerization of N-vinylformamide and at least one monomer selected from the group consisting of vinyl formate, vinyl acetate, vinyl propionate, N-vinylpyrrolidone, acrylic acid, methacrylic acid, the esters, amides and nitrites of acrylic acid or methacrylic acid and $C_1$–$C_4$-alkyl vinyl ethers, cf. EP-B-0 216 387. In the hydrolysis, vinylamine units III and amounts of formic acid equivalent to III are formed from the N-vinylformamide units II of the copolymers:

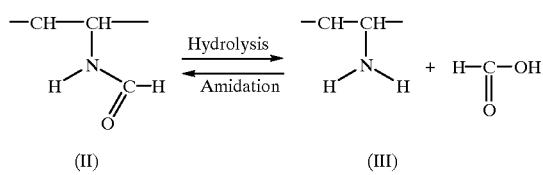

In addition to being copolymerized with the abovementioned comonomers, the N-vinylformamide may also be copolymerized with a number of other monoethylenically unsaturated compounds, for example with other monoethylenically unsaturated carboxylic acids, such as maleic acid, fumaric acid, itaconic acid or ethacrylic acid, esters of the stated carboxylic acids having, for example, 1 to 18 carbon atoms in the molecule, such as monomethyl maleate, dimethyl maleate or isopropyl maleate, acrylamidomethylpropane-sulfonic acid, vinyl sulfonate, vinylimidazole or 2-methylvinyli-midazole. The abovementioned esters of acrylic acid and metha-crylic acid are derived, for example, from alcohols of 1 to 18, preferably 1 or 2, carbon atoms.

Vinyl acetate, vinyl propionate, acrylic acid, methacrylic acid, methyl acrylate, methyl methacrylate, ethyl acrylate, acrylonitrile, methacrylonitrile and/or N-vinylpyrrolidone are preferably used for the preparation of the copolymers of N-vinylformamide.

The hydrolysis of the homo- and copolymers can be continued until all units II present in the polymer are converted into the units III. In most cases, only some of the units II present in the polymers are hydrolyzed. The polymers then contain units of the formulae II and III. The degree of hydrolysis is, for example, from 30 to 100, preferably from 70 to 95, mol %.

The hydrolysis is carried out by methods described in the prior art, exclusively in aqueous solution in the presence of acids. Suitable acids are mineral acids, such as hydrochloric acid, sulfuric acid and phosphoric acid, or organic acids, such as $C_1$–$C_4$-carboxylic acids, for example formic acid, acetic acid, propionic acid or benzenesulfonic acid. Hydrochloric acid is preferably used. The hydrolysis can be carried out, for example, at from 20 to 200° C., preferably from 50 to 90° C., superatmospheric pressure being employed at above the boiling point of the reaction mixture. In order to hydrolyze 1 mol of units of the formula II, from 1 to 3, preferably from 1.1 to 2, mol of at least one acid are generally required. The hydrolysis can be carried out batchwise or continuously.

As disclosed in EP-B-0 216 387 and EP-B-0 251 182, the comonomer units contained in the copolymers may be chemically altered in the hydrolysis. For example, copolymers of N-vinylformamide and vinyl acetate or vinyl propionate undergo hydrolysis to give copolymers which, in addition to vinylformamide units which may still be present, contain vinylamine units and vinyl alcohol units and may contain unhydrolyzed vinyl acetate or vinyl propionate units.

If, for example, methyl acrylate is used as a comonomer, the hydrolyzed copolymers contain acrylic acid units in addition to vinylamine units and possibly vinylformamide units. Acrylonitrile units and methacrylonitrile units, too, are chemically altered in the hydrolysis. These are converted, for example, into acrylamide units and acrylic acid units. The by-products formed from the comonomers in the hydrolysis of copolymers, such as acetic acid in the case of vinyl acetate copolymers and methanol in the case of copolymers of vinylformamide and methyl acrylate, as well as the carboxylic acids formed from the monomers I, are removed from the aqueous reaction mixture with the aid of a distillation.

According to the invention, the carboxylic acids eliminated from the units II of the polymers and the carboxylic acids originating from vinyl ester units which may be present in the polymers are esterified after the hydrolysis by adding at least stoichiometric amounts of at least one $C_1$–$C_6$-alcohol in order to prevent reamidation of units III to II, and the esters are distilled off from the reaction mixture. At least 1, preferably from 1.5 to 2, mol of an alcohol or of a mixture of different alcohols are used per mol of carboxylic acid eliminated from the polymers in the hydrolysis. A larger excess of alcohol than that stated above has no adverse effect but has to be separated off by distillation. Examples of suitable alcohols are methanol, ethanol, propanol, isopropanol, n-butanol, isobutanol, tert-butanol, n-pentanol, n-hexanol and cyclohexanol. Methanol is preferably used for the esterification.

The esterification can be carried out batchwise or, preferably, continuously. In a continuous procedure, the reaction mixture is continuously fed into a distillation column after the hydrolysis and after the addition of at least one alcohol, and the carboxylate is taken off at the top of the column and the aqueous polymer solution is removed continuously from the bottom of the column. The hydrolysis, esterification and distillative removal of the esters can be carried out continuously. The esters can, if required, be distilled off azeotropically from the aqueous polymer solution with the aid of an entraining agent, such as benzene, toluene or xylene. The esters or the acids obtainable therefrom by solvolysis are obtained in high purity and can be reused.

Aqueous solutions of polymers which contain vinylamine units and which, after neutralization which is carried out if required, contain only small amounts of neutral salts, for example sodium chloride, are obtained, said solutions having a long shelf life. The content of neutral salts in the aqueous polymer solution is not more than 5% by weight after the removal of the esters by distillation and the neutralization. The hydrolyzed polymers have K values (determined according to H. Pikentscher in 1% strength by weight aqueous solutions at 25° C. and pH 7) of at least 10. The K values are usually from 30 to 120.

The aqueous polymer solutions may contain up to 50% by weight of polymer in dissolved form. The polymer concentrations in the aqueous solutions are usually from 4 to 25, preferably from 8 to 18, % by weight. The aqueous solutions of polymers containing vinylamine units are used as dry and wet strength agents in papermaking. The amounts of polymer required for this purpose are usually from 0.05 to 5, preferably from 0.2 to 3, % by weight, based on dry fiber.

In the examples which follow, percentages are by weight. The K values were determined according to H. Fikentscher, Cellulose-Chemie 13 (1932), 58–64 and 71–74, in 1% strength by weight aqueous solution at pH 7 and 25° C.

EXAMPLES

Example 1

100 kg of a 15.5% strength aqueous solution of polyvinylformamide having a K value of 85 are initially taken in an enameled reactor which is provided with a stirrer and metering apparatuses. 9.5 kg of hydrogen chloride are passed in at room temperature in the course of 2 hours while stirring, and the reaction mixture is cooled 80 that the temperature is kept below 50 ° C. Thereafter, the reactor content is heated at 70° C. for 4 hours, after which the reaction mixture is allowed to cool. As soon as it has reached 30° C., it is partially neutralized by adding 3.0 kg of 50% strength aqueous sodium hydroxide solution a little at a time. The resulting pH is 0.5. 112.5 kg of a polymer solution which contains 8.5% of formic acid are obtained. The degree of hydrolysis of the polymerized N-vinylformamide units is 95 mol %. For testing the performance characteristics and determining the shelf life, 1 kg of the material from which acid has not been eliminated is brought to a pH of 5 with 158 g of 50% strength sodium hydroxide solution (polymer solution 1).

In order to remove the formic acid from the aqueous polymer solution, which contains the hydrolyzed polyvinylformamide, 6.7 kg of methanol are dissolved therein. This solution is then fed at a constant feed rate of 1076 g/h into the middle of a bubble tray column (height of the column 260 cm, diameter 5 cm, number of plates 30). The reflux within the column, which is ideally 20% of the feed and hence determines the temperature profile of the column, is adjusted so that the bottom temperature is 100° C. after the steady state has been reached, the temperature at the feed point is 70° C. and the temperature at the top of the column is 33° C. 85 g/h of methyl formate are discharged at the top of the column, and 976 g/h of aqueous polymer solution at the bottom of the column. The aqueous polymer solution contains 0.3% by weight of formic acid, 96.5% by weight of the formic acid originally present in the polymer solution having been removed in the form of methyl formate. 47.4 g of water and 35.8 g of 25% strength sodium hydroxide solution are added per kg of solution, the resulting pH being 5.0. The solution from which acid has been eliminated has a polymer content of 13.4% and a viscosity of 600 mPas (Brookfield, 20° C.) (polymer solution 2).

Example 2

100 kg of a 15.6% strength aqueous emulsion of a copolymer of 70% by weight of N-vinylformamide and 30% by weight of vinyl acetate, having a K value of 100, are initially taken in an enameled reactor, provided with a stirrer and metering apparatuses, and are continuously stirred. 6.7 kg of hydrogen chloride are passed into the reactor in the course of 1.5 hours, and the reaction mixture is cooled so that its temperature remains below 50° C. Thereafter, the mixture is heated to 70° C. and stirred for 5 hours at this temperature and then cooled to 30° C. As soon as this temperature has been reached, 2.2 kg of 50% strength aqueous sodium hydroxide solution are added a little at a time. 108.9 kg of an aqueous solution of the hydrolyzed copolymer having a pH of 0.5 are obtained. This polymer solution contains 6.2% of formic acid and 2.7% of acetic acid. The degree of hydrolysis of the polymerized N-vinylformamide units is 95 molt, and 90 molt of the vinyl acetate units are hydrolyzed.

In order to remove the eliminated carboxylic acids from the aqueous solution of the hydrolyzed copolymer, 6.7 kg of methanol are dissolved therein and the solution thus obtained is fed at a constant feed rate of 995 g/h into the middle of a bubble tray column which is 260 cm long and has a diameter of 5 cm and 30 theoretical plates. The reflux within the column, which is ideally 20% of the feed and thus determines the temperature profile of the column, is adjusted so that the temperature at the bottom of the column is 100° C., the temperature at the feed point is 70° C. and the temperature at the top of the column is 33–57° C. 108.7 g/h of a mixture of methyl formate and methyl acetate are discharged at the top of the column, and 880.2 g/h of aqueous polymer solution which still contains 0.2% of formic acid and 0.3% of acetic acid are discharged at the bottom of the column. Finally, 440 g of water and 28 g of 25% strength aqueous sodium hydroxide solution are also added per kg of solution, the resulting pH being 5.0. The solution has a polymer content of 11.0% and a viscosity of 1800 mPa.s (Brookfield, 20° C.).

Example 3

Testing of performance characteristics

The tests (a)–(c) are comparative examples and (d) is an example according to the invention.

A 0.5% strength stock suspension in water was prepared from 50% of spruce sulfite pulp and 50% of beech sulfite pulp. The pH of the stock suspension was 7.0 and the Schopper-Riegler (SR) freeness was 30°. The stock suspension was then divided into 4 equal parts, 2 of which were mixed with the additives stated under b) and c). The 4 stock suspensions were then processed in a Rapid-Köthen laboratory sheet former to give sheets having a base weight of 80 g/m².

Composition of the stock suspensions:

a) The stock suspension contained no further additives.

b) 0.5 %, based on the fibers, of an aqueous solution of a commercial neutral wet strength resin based on a reaction product of epichlorohydrin and a polyamidoamine obtained from diethylenetriamine and adipic acid was added to the stock suspension.

c) 0.5 %, based on dry fiber, of polymer of the polymer solution 1 according to Example 1, from which acid had not been eliminated, was added to the stock suspension.

d) 0.5 %, based on dry fiber, of polymer of the polymer solution 2 according to Example 1, from which acid had been eliminated, was added to the stock suspension.

Sheets a) to d) were produced from the paper stock suspensions described above. The wet breaking length of the sheets obtained was measured. The measurement was first carried out immediately after preparation of the polymer solutions and was then repeated after a storage time of 4 months. The results are shown in the table.

TABLE

| Example 3 | DH[2] [%] | Wet breaking length [m] immediately after production | | DH [%] | Wet breaking length [m] after a storage time of 4 months | |
|---|---|---|---|---|---|---|
| | | unaged | aged[1] | | unaged | aged[1] 5 min 110° C. |
| a) | — | 109 | 125 | | 146 | 146 |
| b) | — | 690 | 855 | — | 650 | 747 |
| c) | 95 | 755 | 812 | 82 | 605 | 611 |
| d) | 95 | 806 | 902 | 95 | 734 | 768 |

[1]The sheets were aged by heating them at 110° C. for 5 min
[2]DH = Degree of hydrolysis, measured by polyelectrolyte titration

We claim:

1. A process for the preparation of an aqueous solution of a polymer containing vinylamine units, which solution has a long shelf life, by hydrolyzing a polymer containing N-vinyl-formamide units with an acid in an aqueous medium and removing formic acid eliminated from the polymer from the aqueous polymer solution, wherein a polymer containing N-vinylformamide units is used and the eliminated formic acid is esterified by adding at least a stoichiometric amount of at least one $C_1$–$C_4$-alcohol after the hydrolysis to obtain a formate ester reaction mixture and formate ester is distilled off from said reaction mixture, resulting in an aqueous polymer solution containing not more than 5% by weight of neutral salts, wherein the reaction mixture is fed continuously into a distillation column after the hydrolysis and after the addition of sad at least one alcohol, the formate ester is removed continuously at the top of the column and the aqueous polymer solution is removed continuously from the bottom column.

2. A process as claimed in claim 1, wherein a homopolymer containing N-vinylformamide units is hydrolyzed.

3. A process as claimed in claim 1, wherein a copolymer which contains (a) from 5 to 95 molt of N-vinylformamide units and (b) from 95 to 5 molt of units of at least one monomer selected from the group consisting of vinyl acetate, vinyl propionate, N-vinylpyrrolidone, acrylic acid, methacrylic acid, the esters, amides and nitriles of acrylic acid or methacrylic acid and $C_1$–$C_4$-alkyl vinyl ethers is hydrolyzed.

4. A process as claimed in any of claims 1 to 3, wherein the eliminated formic acid is esterified with methanol.

5. A process of papermaking, comprising adding to a suspension of paper pulp, an aqueous solution of a polymer containing a vinyl amine unit, wherein said aqueous solution has been prepared according to the process of claim 1.

* * * * *